United States Patent [19]

Krone et al.

[11] 3,806,650

[45] Apr. 23, 1974

[54] APPARATUS FOR REMOTE REGISTER READOUT

[76] Inventors: Russell R. Krone; Donald R. Krone, both of 417 N.W. 106th, Oklahoma City, Okla. 73114

[22] Filed: Jan. 17, 1969

[21] Appl. No.: 792,087

[52] U.S. Cl. .............................. 179/2 A, 340/347 P

[51] Int. Cl. .......................................... H04m 11/06

[58] Field of Search .......... 179/2 R, 2 DP; 340/203, 340/206, 207, 209, 159, 347A–347 P, 347 PR; 235/34, 41

[56] References Cited

UNITED STATES PATENTS

| | | | |
|---|---|---|---|
| 1,955,043 | 4/1934 | Yates | 179/2 |
| 2,035,358 | 3/1936 | Yates | 179/2 |
| 3,275,807 | 9/1966 | Harper | 340/347 PR |
| 3,265,868 | 8/1966 | Devanney | 340/347 PTR |
| 3,249,742 | 5/1966 | Buchsbaum | 340/347 PR |

OTHER PUBLICATIONS

"Remote Meter Reading Equipment for Operation Over the Telephone Network"; pages 1–6, figures 2,3,4,6; Sept. 27, 1962; Transitel International Corp.

*Primary Examiner*—Kathleen H. Claffy
*Assistant Examiner*—Thomas D'Amico
*Attorney, Agent, or Firm*—Dunlap, Laney, Hessin and Dougherty

[57] ABSTRACT

Apparatus for interrogating remotely disposed registers from a central position to provide a display for recordation of register indication, the apparatus consisting of a rotary register switching device which provides a switch closure indicative of a particular digit or series of digits upon periodic enablement by a scanning apparatus that is controlled from the central position upon pre-determined interrogation. Digital indications from the rotary switch are conducted to a suitable form of transmitter-receiver network which is in communication with the central location, commercially available dataphone connection being particularly suited for such interconnection, and digital indications received at the central location are then applied to suitable display, recording, computation, etc. structure.

8 Claims, 14 Drawing Figures

INVENTORS
RUSSELL R. KRONE &
DONALD R. KRONE
BY
Dunlap, Laney, Hessin & Dougherty
ATTORNEYS INVENTORS
RUSSELL R. KRONE &
DONALD R. KRONE
BY
Dunlap, Laney, Hessin & Dougherty
ATTORNEYS INVENTORS
RUSSELL R. KRONE &
DONALD R. KRONE
BY
Dunlap, Laney, Hessin & Dougherty
ATTORNEYS INVENTORS
RUSSELL R. KRONE &
DONALD R. KRONE
BY
Dunlap, Laney, Hessin & Dougherty
ATTORNEYS

APPARATUS FOR REMOTE REGISTER READOUT

BACKGROUND OF THE INVENTION

1. Field of the Invention

The invention relates generally to apparatus for readout of a remote data register and, more particularly, but not by way of limitation, it relates to improved readout apparatus for employ with existing interconnection and/or interface units.

2. Description of the Prior Art

The prior art includes a great many different types of apparatus which carry out the remote readout function with varying degrees of efficiency and speed. Many of such prior equipments consist of a form of basic interrogation equipment which is capable of providing some form of digital readout and transmission via leased interconnection lines, such digital indications being conveyed by means of different forms of electronic treatment, e.g. pulse time, pulse amplitude, etc. Digital readout devices employed in the various ones of the prior systems include characteristic structure as necessitated by individual applications which impose limitations as to their versatility of use.

SUMMARY OF THE INVENTION

The present invention contemplates a system for reading a remote register for indication at a central position. In a more limited aspect, the invention consists of a rotary readout device to be driven by a register to provide a circuit closure for each digit of the register reading whereby a scanning device is actuated through interrogation from a remote position to provide readout of the digital closure indications from the rotary selector device. The scanned switch closure indications are then applied to an interface equipment for transmission through an existing data linkage to a central station, whereupon respective ones of the digital indications are detected and applied to print-out or recordation equipment. It is also contemplated that scanned digital information at the meter location may be encoded or converted into a selected binary code for transmission over the telephone line and subsequent application to computer input equipment at the central location.

Therefore, it is an object of the present invention to provide a remote register reading system which is simpler and more reliable than existing apparatus performing the similar functions.

It is also an object of the invention to provide a register readout device which eliminates many possibilities of erroneous digit indication through inclusion of odometer-type rotation of switching elements.

It is still further an object of the present invention to provide a remote register readout device which is compatible for adaptation to existing dataphone telecommunications networks.

Finally, it is an object of the present invention to provide a meter reading system which can be applied to provide readout from diverse types of meters and registers to provide indication of varying numbers of integers and/or fractions or decimal places.

Other objects and advantages of the invention will be evident from the following detailed description when read in conjunction with the accompanying drawings which illustrate the invention.

DETAILED DESCRIPTION OF PREFERRED EMBODIMENT

Figure 1:
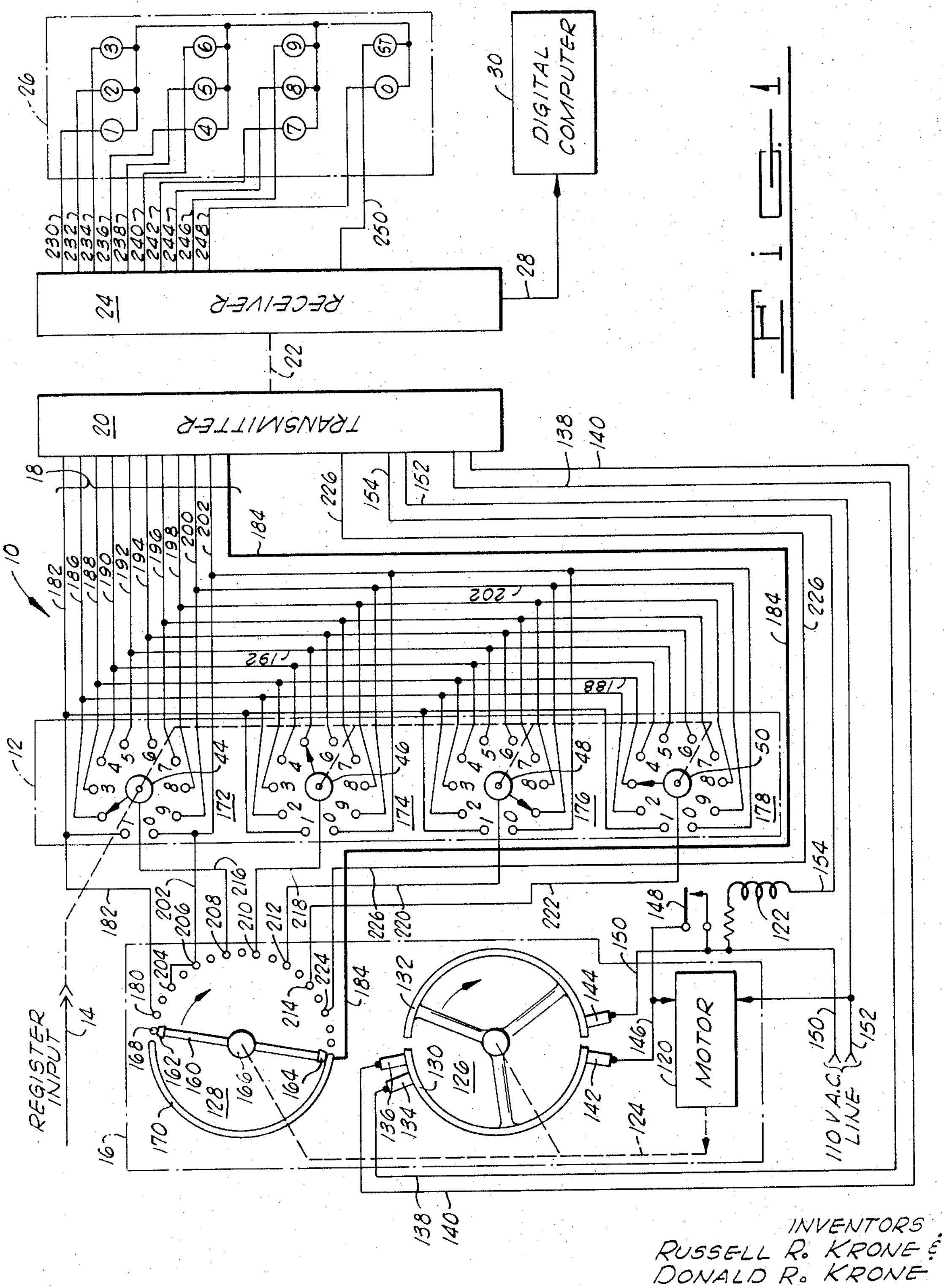
FIG. 1 is a schematic diagram of the system of the invention.

As shown in FIG. 1, a remote register readout system 10 includes a digital selector 12 which is suitably mounted at the remote location to receive metered motion as by rotational input to a register input 14. A scanner 16 is electrically connected to the digital selector 12 and capable of enabling electrical output via selected ones of leads 18 to a transmitter 20 connected to an intercommunication line 22, e.g. a telephone line. A receiver unit 24 is connected to the intercommunication line 22 at a central location to provide an output via selected connections, as will be further described, for the purpose of energizing such as a print-out unit 26 of conventional type. In one form, the output from receiver 24 is utilized to energize a digital print-out unit 26, for example, a well-known form of solenoid print deck. It should also be understood that the output from receiver 24 can be applied via a suitable output link 28 for application to a digital computer 30 for billing purposes, record storage, etc.

Figure 2:
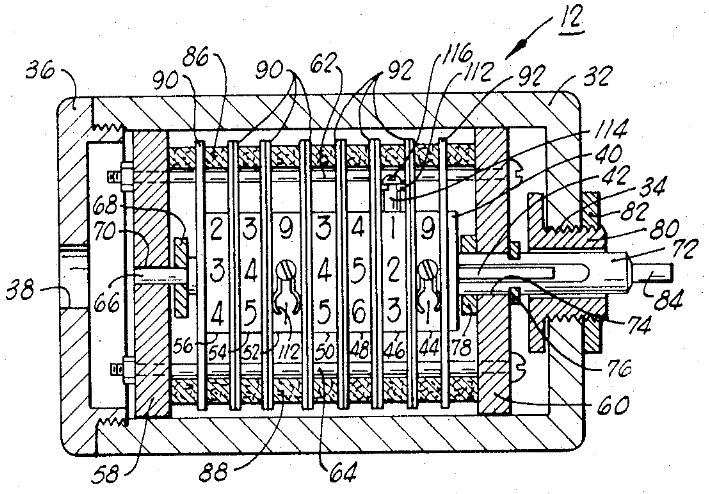
FIG. 2 is a vertical section through a digital selector constructed in accordance with the invention.
Figure 3:
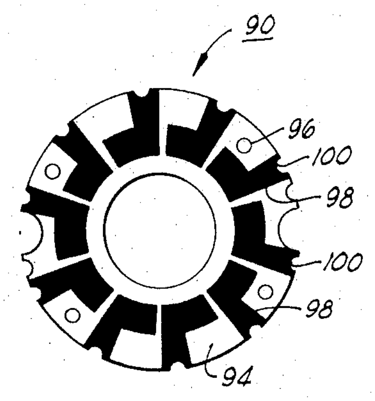
FIG. 3 is a plan view of one form of contact wafer employed within the digital selector of FIG. 2.
Figure 4:
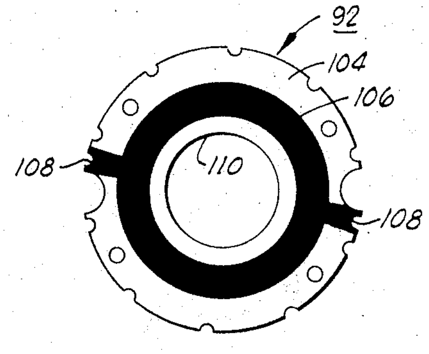
FIG. 4 is a plan view of another type of contact wafer which is employed in the digital selector of FIG. 2.

The digital selector 12 embodies unique construction which provides advantageous function, such structure being shown in more detailed form in FIGS. 2, 3 and 4. FIG. 2 is a vertical section of digital selector 12 which consists of its outer, cylindrical casing 32 having an axial, threaded hole 34 at one end with the other end closed by a screw plate 36 having an axial, cable access hole 38 formed therethrough. The standard form of odometer having a rotary central shaft 42 is employed therein to provide digital count registry. The odometer 40 may be a commercially available type of unit, e.g.

a Series 1097 odometer, available from Veeder-Root Inc. of Hartford, Conn. This type of odometer is characterized by the fact that each successive one of the counter wheels 44, 46, 48, 50, 52, 54 and 56 can make movement through a single digital number, or one-tenth of a rotation, only upon completion of a complete rotation of a respective preceding rotary wheel.

The odometer 40 is supported between a pair of parallel, spaced end supports 58 and 60 which, as retained by securing bolt 62 and 64, are slidable within cylindrical casing 32. A stationary shaft 66 of odometer 40 is inserted within a centrally located hole 70 in the end support 58. The other end of odometer 40, the rotary shaft 42, is keyed for rotation with a drive shaft 72 which is inserted through a central hole 74 and end support 60 for retention therein by means of a spring-type retaining ring 76. A spacer 78 is disposed about the inner end of drive shaft 72 between odometer 40 and the inner side of end support 60. Sealed entry to cylinder casing 32 is provided by means of an axially disposed threaded bushing 80 secured by an external retaining nut 82. The outer end 84 may be shaped in any desired manner to provide a key connection for receiving metered drive input to the odometer 40.

Insulative spacer members 86 and 88 are disposed between opposite, outer extremities of end supports 58 and 60 to provide spacing of the plurality of contact wafers as maintained on each side of each of the counterwheels 44 through 56. Thus, a plurality of digit contact wafers 90 (FIG. 3) are retained on respective first sides adjacent each counter wheel 44–56 while a common contact wafer 92 (FIG. 4) is retained on the opposite sides relative to each of the respective counter wheels 44 through 56.

As shown in FIG. 3, the digit contact wafer 90 consists of a generally circular, insulative wafer member 94 including a plurality of holes 96 and having 10 equally-spaced, copper-clad contacts 98 formed thereon. The plurality of semi-circular indentations 100 provide solder points. The circular center 102 is formed to be of a diameter which is slightly larger than that of odometer 40 such that it is allowed to rotate freely therein. Referring also to FIG. 4, the common contact wafer 92 is similarly formed of insulative material 104 as clad with a continuous circular contact cladding 106 which is led out on each side to a solder point 108. A circular center hole 110 is formed within contact wafer 92 to have the same diameter as center hole 102 of contact wafer 90.

Each counter wheel 44 through 56 is disposed to have a digital contact wafer 90 and a common contact wafer 92 disposed on each side thereof. Each counter wheel 44 through 56 also has a spring contact 112 fastened at its zero count position (this is merely an arbitrary placement) as retained on an insulative contact post 114 secured by a screw fastener 116. The spring contact 112 is adapted to contact a digital contact wafer 90 for short circuiting to a common contact wafer 92 at whatever the rotary positioning of the respective counter wheels 44 through 56 (not all contactors being shown in FIG. 2). The access hole 38 provides a cable entry which can be sealingly closed, and individual wires from an input cable can be led around the outer circumference of the plurality of wafers 90 and 92 for securing at their proper positions.

Referring again to FIG. 1, the scanner 16 consists of a motor 120 which is periodically actuated by energization of a relay coil 122 to provide drive output via dashed line 124 to transmit synchronous rotation to a commutator element 126 as well as to rotary scanning switch 128. The commutator element 126 consists of a pair of semi-circular shorting bars 130 and 132 which may be driven in a clockwise rotation to carry out their control functions. One shorting bar is maintained in contact with brushes 134 and 136 which are connected to respective line control leads 138 and 140 which are connected to transmitter 20. A pair of motor control brushes 142 and 144 are disposed to be shorted by the right-side semi-circular shorting bar, in this case bar 132, after initial energization of motor 120 to start the rotation of commutator element 126. Control brush 142 is connected to a lead 146 which leads to motor 120 and, in parallel, to relay contact 148, while control brush 144 is connected directly to a 110 volt input lead 150. The other side of the 110 volt line input, lead 152, is connected to transmitter 20 and upon actuation, in response to a signal from receiver 24, a "data set ready" energization is provided via lead 154 to energize relay coil 122 and cause conduction through relay contact 148.

The scanning selector 128 consists of a shorting arm 160 having contacts 162 and 164 at respective ends thereof and being rotationally driven by a central axial member 166 which receives motor rotation via line 124. Selector arm 160, shown in its "at rest" position, is driven clockwise upon energization of motor 120 such that contact 162 comes into successive contact with each of a plurality of contacts 168. The rotary arm contact 164 is maintained in continuous contact with the semi-circular shorting bar 170. The function of contacts 162 and 164 are reversed on each half cycle of shorting arm 160. Various ones of the contacts 168 are connected to the digital selector 12 and transmitter 20 for the purpose of carrying out the scanning function to drive successive digital indication as will be further described below.

While the digital selector of FIG. 2 shows a possibiltiy of seven counter wheels (44–56) and, therefore, seven digital decade selectors, the digital selector 12 would only employ four decades for an application requiring the wiring as shown in FIG. 1. Thus, drive actuation to respective decade selectors of digital selector 12 might be conveyed by rotation of counter wheels 44, 46, 48 and 50 and, for purposes of further explanation, these decades are referred to as units decade 172, tens decade 174, hundreds decade 176 and thousands decade 178.

The units decade 172 may also be employed to convey meter indication when more than one meter is to be read from a single remote location or telephone access. Thus, upon the start of scanning rotation of contact arm 160, meter identification indication is first dispatched. That is, the contact 162 (in this instance) makes contact with contact 180 which connects a lead 182 and semi-circular shorting bar 170 to common lead 184 leading back to transmitter 20. Shorting lead 182 is connected to the "one" decade contact of switch decade 172 which, in turn, is connected back to transmitter 20 for further transmission to the transmitting station. The identification numbers may be any desired combination in addition to the one contact and this may require utilization of selected ones of additional decade contacts "two" through "zero" which provide switch closure conduction via leads 186, 188, 190, 192,

194, 196, 200 and 202, respectively. Thus, as can be seen, in FIG. 1, scanner contacts 204 and 206 are both shorted to the zero contact of selector decade 172 such that operation of scanner 128 will cause a "1-0-0" indication to identify the particular meter.

After identification, further rotation of scanner rotary selector arm 160 will successively pass over the contacts 208, 210, 212 and 214 to enable conduction of digital indications to respective selector decades 172 through 178. As shown in FIG. 1, the units decade 172 is reading at the two positions such that switch closure through rotary arm 160 to contact 208 and a lead 216 will be indicated through lead 186 to transmitter 20. Similarly, successive contact of rotary arm 160 through to respective interrogator leads 218, 220 and 222 will provide digital indications of the remaining decades 174, 176 and 178. Decade 174 will provide switch closure through the six contact and lead 192 to transmitter 20, while decades 176 and 178 provide similar reading of respective nine and three indications via leads 202 and 188.

Further rotation of scanner 128 causes a rotary arm 160 to make with a contact 224 which applies a switch-closure indication via lead 226 back to transmitter 20 for employ as a print-out command signal. That is, after the meter identification digits have been read and accumulated, and after all decades of the meter have been read and accumulated, the "print-out" command signal is sent to actuate the printer 26 and/or other such totalizing indicators.

After still further rotation of rotary arm 160 it returns to the start position as shown, although on the next cycle the positions of contacts 162 and 164 would be reversed. The scanner 128 is stopped in the position as shown after each scanning sequence due to the fact that motor brushes 142 and 144 are so disposed that they will become positioned on opposite sides of a commutator gap between semi-circular shorting bars 130 and 132.

Digital indications of meter identifying numbers as well as decade readout values are transmitted through transmitter 20 via an intercommunication line 22, e.g. telephone lines, to a receiver 24. Digit indication in the form of energization of the respective leads 230 through 248 will apply print energization for the respective digits one through zero of printer 26. The print-out command signal, as present at lead 226 to transmitter 20, is conducted from receiver 24 via a lead 250 to actuate printout of all retained digital values in printer 26.

The communication devices employed for transmitter 20, intercommunication link 22, and receiver 24 may take various forms, either wire or wireless, and these may function with any of several pulse, amplitude or frequency techniques. However, it has been found that the remote register readout system 10 functions to excellent advantage when a standard dataphone interconnection is employed. Such dataphone interconnection is shown more specifically in FIG. 5, like parts being designated the same, and standard interconnection procedure allows the system 10 to be connected directly therethrough.

Thus, for example, a conventional Bell System data set, Type 401H, transmitter unit may be employed. Such transmitter unit includes structure for automatic answering, line holding, line status indication, and tone oscillator circuits. Digital value differentiation is effected by tone frequency variation and the standard dataphone frequencies may be employed. In this case, switch closures present on any one of input leads 182 through 202, (FIG. 5) would cause a characteristic tone output from data transmitter 260 for conduction through telephone lines 262 to a data receiver 264 such as a conventional Type 401J data receiver, a companion Bell System equipment.

Frequency assignments would be as follows:

| Oscillator A | Oscillator B | Oscillator C |
|---|---|---|
| $A_0$—600 Hz (rest) | $B_0$—1098 Hz | |
| $A_1$—697 Hz | $B_1$—1209 Hz | $C_1$—2050 Hz |
| $A_2$—770 Hz | $B_2$—1336 Hz | $C_2$—2150 Hz |
| $A_3$—852 Hz | $B_3$—1477 Hz | $C_3$—2250 Hz |
| $A_4$—941 Hz | $B_4$—1633 Hz | $C_4$—2350 Hz |

Figure 5:
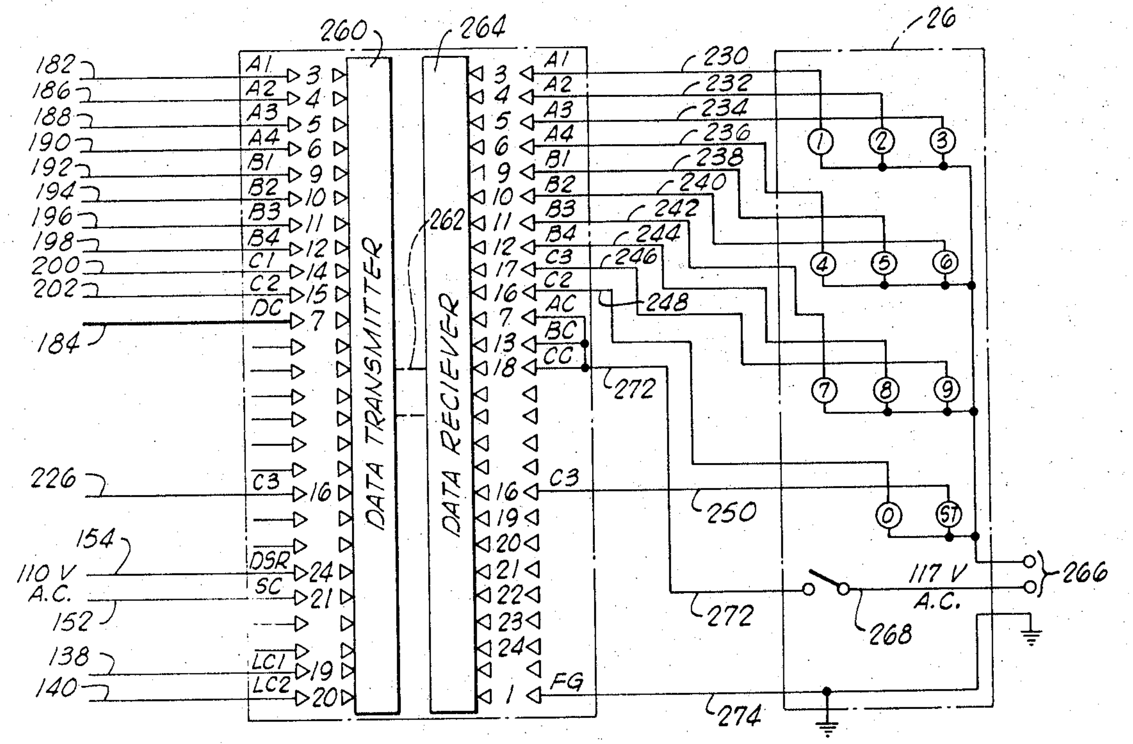
FIG. 5 is an interconnection diagram for specific dataphone interconnection as may be employed in the system of FIG. 1.

There are various other forms and models of data equipment which are compatible with the readout system 10. The Bell System dataphone sets 401E and 402E along with types 402C and 402D are directly interchangeable within the interconnection as shown in FIG. 5. The digit output leads 230 through 248 can be applied directly to the print-out unit 26 to energize or enable solenoids indicative of digits 1 through 0, and a print-out command signal on lead 250 is applied to the print-out unit 26 to actuate printing of the enabled digital indications. Since the line voltage from input terminals 266 is applied through a lead 268 to an energizing switch 270 and lead 272 for input to the data receiver 264. System ground is carried through all equipment via a ground line 274. Indicating output from data receiver 264 may be applied to various output devices other than a print-out unit 26, this depending upon the exigencies of particular applications. Thus, as will be further described below, the output from data receiver 264 can be obtained in binary or such coded form for direct input to a digital computer 30 (FIG. 1).

In operation, interrogation of a selected meter is initiated at receiver 24. The following being described with respect to Bell system data communications equipment, viz. dataphone transmitter 401H and dataphone receiver 401J interconnected as shown in FIG. 5, a conventional telephone number indicative of a selected meter at some remote location may be dialed in at data receiver 264. The interrogation command signals in the form of multiple tone combinations are conducted along telephone line 262 for receipt at data transmitter 260 responsive to the particular dialed telephone number.

Data transmitter 260 is then actuated to readiness and a "data set ready" signal is conducted via lead 154 to energize relay coil 122 to initiate scanning operation. Energization of relay coil 122 closes relay contact 148 to apply line voltage across the motor 120 such that commutator element 126 and scanner 128 are started in revolution. After initial starting, the semi-circular shorting bar 132 (or its counterpart in alternate cases) of commutator element 126 is moved in shorting contact across both of line control brushes 142 and 144 to maintain holding energization across motor 120 whereupon relay coil 122 is allowed to de-energize until next actuation. Answer back control is maintained through brushes 134 and 136 as connected through respective leads 138 and 140 to the data transmitter 260.

In the event that there is more than one meter located at a remote station, i.e. a dialed telephone call number, each meter can be assigned a digital number capable of being read out from scanner 128 in conjunction with first selector decade 172. For example, as shown in FIG. 1, the illustrated meter station is assigned the call numerals 1-0-0 such that rotation of selector arm 160 will carry the shorting contact 162 in succession past contact 180 and lead 182 to a one digit lead 182; and then successively past contacts 204 and 206 whereupon each is shorted to lead 202 which is the 0 lead as applied to data transmitter 260.

Upon further rotation of rotary selector arm 160, short circuit is made from the semi-circular shorting bar 170 to successive contacts 208, 210, 212 and 214 which provide switch closures through the appropriate digital rotational setting of respective decade selectors 172, 174, 176 and 178. For the meter settings as shown in FIG. 1, a digital reading of "three" (thousands) "nine" (hundreds) "five" (tens) "two" (units) is read out by switch-closures conducted along respective leads 188, 202, 192, and 186 to the data transmitter 260 (FIG. 5).

The appropriate switch-closures are conducted through the intercommunications system to data receiver 264 whereupon they are conducted through respective ones of output leads 230 through 248 to enable certain of the solenoid or such print devices in the print-out unit 26. Back at the scanner 16, the short circuiting of rotary selector arm 160 to contact 224 and lead 226 provides the print-command signal or switch closure which is also applied back through data transmitter 260, telephone line 262 and data receiver 264 for application via lead 250 to energize the print-out unit 26 to print the meter identification values along with the digital reading for that particular meter. As previously stated, output from dataphone receiver 264 may take various forms utilizing any of several codes and numerical relationships.

Figure 6:
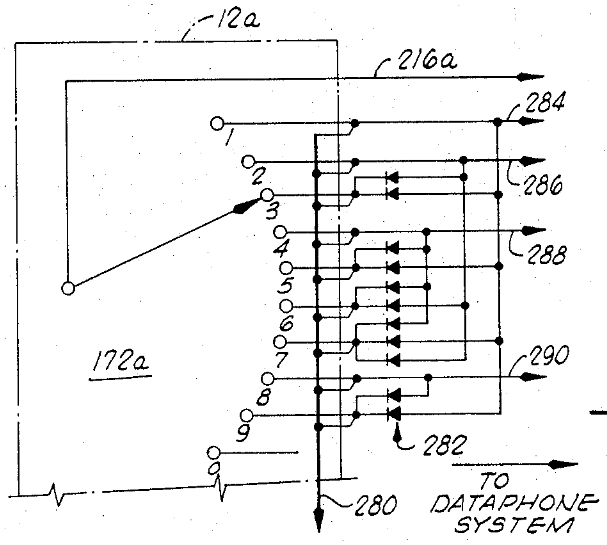
FIG. 6 is a schematic diagram illustrating the manner in which a digital selector may be connected as a binary code encoder.

FIG. 6 illustrates an alternative form of circuitry which can be included in digital selector 12 to provide a coded readout, in this case an 8-4-2-1 binary code. FIG. 6 illustrates a single decade 172*a* of a digital selector 12*a;* however, it should be understood that any selected number of additional decades may be ganged therebelow. A paralleling lead 280 designates generally that all leads to the digital contacts of each decade unit are connected in parallel. A convention form of diode array 282 is connected to encode the 10 decade outputs to a binary code on four leads, lead 284, lead 286, lead 288 and lead 290. The diode array 282 limits energization of one or more of the leads 284 through 290 in accordance with a conventional binary code.

Output from the encoding type of digital selector 12*a* via leads 284 through 290 is compatible for input to most computer systems, and such output is readily convertible for input to diverse other forms of computer, totalizers, billing apparatus, etc. The remote register readout system 10 enables the reading of remote meters, counters, registers, etc. from central offices and/or locations where the information is actually to be stored or used. It should be understood that the system can be employed to read any meter, register, etc. which reads out in numbers that can be made to respond through the digital system. Typical uses of the remote register readout system 10 would be for installation in reading pressure differential meters, flow meters, temperature gauges, pressure gauges, counters, cash registers, and various other forms of registering and accounting apparatus.

Figure 7A:
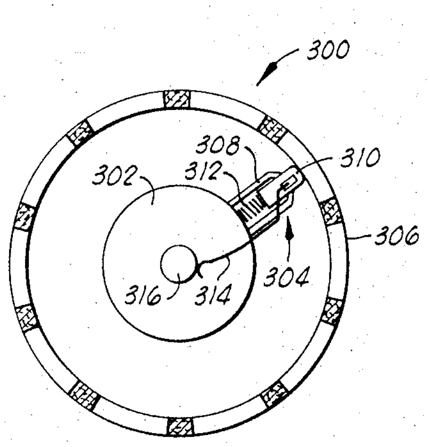
FIG. 7A is a vertical section of an alternative form of digital selector.
Figure 7B:
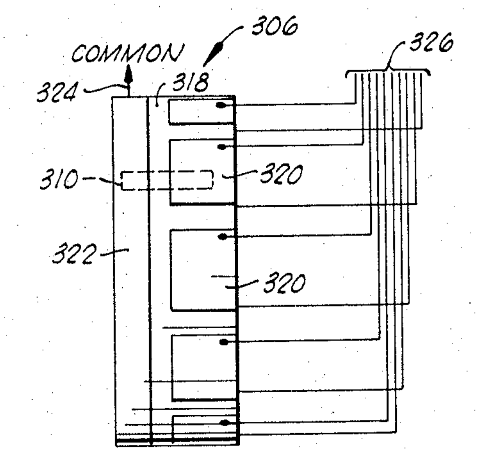
FIG. 7B is an end view of the digital selector of FIG. 7A.

FIGS. 7A and 7B illustrate an alternative form of contacting structure which can be employed in individual decade units of digital selectors 12. A single decade unit 300 would consist of an odometer counter wheel 302 having a brush structure 304 secured thereon at an appropriate digital position and contacting the innersurface of a digital contact ring 306. The brush structure 304 consists of a brush holder 308 and brush 310 urged by spring 312 outward into firm contact with contact ring 306. A suitable form of contact 314 is connected from brush 310 to a common connection, e.g. the counter shaft 316. The contact ring 306, as shown in FIG. 7B, may be formed from an insulated material 318 carrying a pattern of conductive inlays 320, ten such inlays 320 being disposed in equi-spaced relationship around ring 306. A common inlay 322 is disposed entirely around one side of ring 306 spaced from each of the digital inlays 320 such that brush 310 causes periodic shorting of each digital inlay 320 to common inlay 322 as it revolves therearound. An output 324 provides a common connection from common inlay 322 while a plurality of leads 326 are connected one each to a respective digital inlay 320.

Figure 8A:
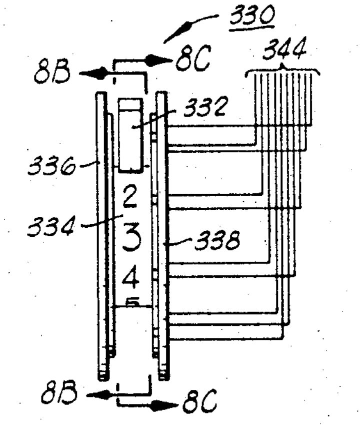
FIG. 8A is an end view of still another alternative form of digital selector.
Figure 8B:
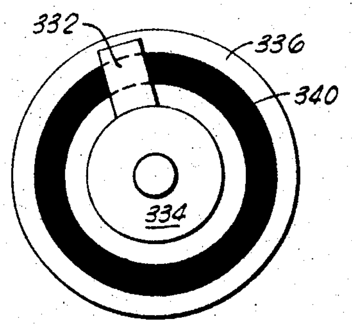
FIG. 8B is a section taken along lines 8B—8B of FIG. 8A.
Figure 8C:
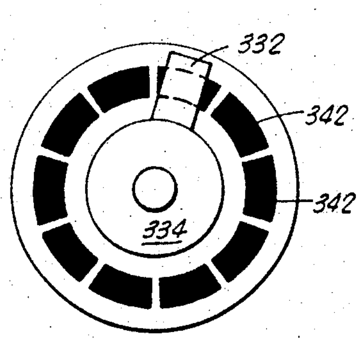
FIG. 8C is a section taken along lines 8C—8C of FIG. 8A.

FIGS. 8A, 8B and 8C illustrate still another alternative form of decade unit 330 which is suitable for employ in such as digital selector 12. This is a capacitive type of device and requires that a metal plate or suitable dielectric variant 332 be secured at an appropriate point about digital counter wheel 334, a common capacitive wafer 336 and a digit capacitive wafer 338 are disposed on each side of counterwheel 334 so that rotation thereof will carry plate 332 around the circumference of wafers 336 and 338 in capacitive relationship. The common capacitor wafer 336 includes a circular array of conductive cladding 340 continuously therearound. The digit capacitive wafer 338 carries 10 equal segments of conductive cladding 342. A plurality of leads 334 connected to each of the digital conductive segments 342 convey capacitive changes in accordance with positioning of plate 332 around its circumference.

Figure 9:
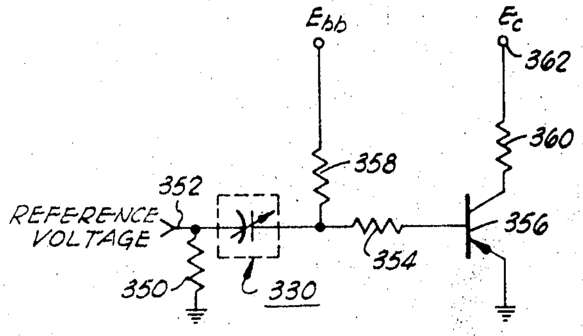
FIG. 9 is a schematic diagram of a form of electronic circuitry as may be employed with the digital selector of FIGS. 8A, B, and C.

There are various forms of circuitry which may be utilized to respond to the capacitive type of decade unit 330 of FIG. 8. Thus, an input indicating a change of capacity could be applied in the position as shown in dash lines in FIG. 9. The decade unit 330 would be connected through a resistor 350 to ground and a predetermined reference voltage would be applied at input 352. The other side of decade unit 330 would then be applied through a limiting resistor 354 to the base of an npn-type transistor 356. Base bias is provided from B plus through a resistor 358 and the collector of transistor 356 is biased through a load resistor 360 to a collector voltage input 362. The variation in capacity through decade unit 330 causes proportional variation of conduction from ground through transistor 356.

Figure 10:
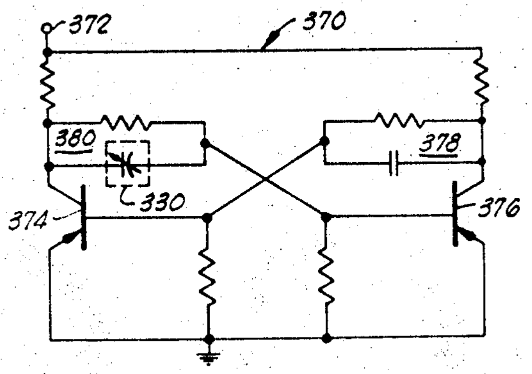
FIG. 10 is an alternative form of electronic circuitry which may be employed with the digital selector of FIGS. 8A, B and C.

Still another form of circuit responsive to the capacitive type decade unit 330 is shown in FIG. 10. A control circuit 370 as energized from a voltage source 362 is a conventional cross-coupled flip-flop amplifier. Circuit 370 consists of a pair of grounded emitter npn-type transistors 374 and 376 which are cross-coupled to provide flip-flop actuation. A resistor-capacitor network 378 is connected from the collector of transistor 376 to the base of transistor 374. A resistor-capacitor network 380, which includes the capacitive decade unit 330, is connected between the collector of transistor 374 and the base of transistor 376. The charge of the variable capacitor or decade unit 330 determines which transistor of the flip-flop combination will be conductive and, as the capacitive actuating plate 332 (FIGS. 8B and C) is actuated from one digital position to a next, the flip-flop array changes conduction states.

Figure 11:
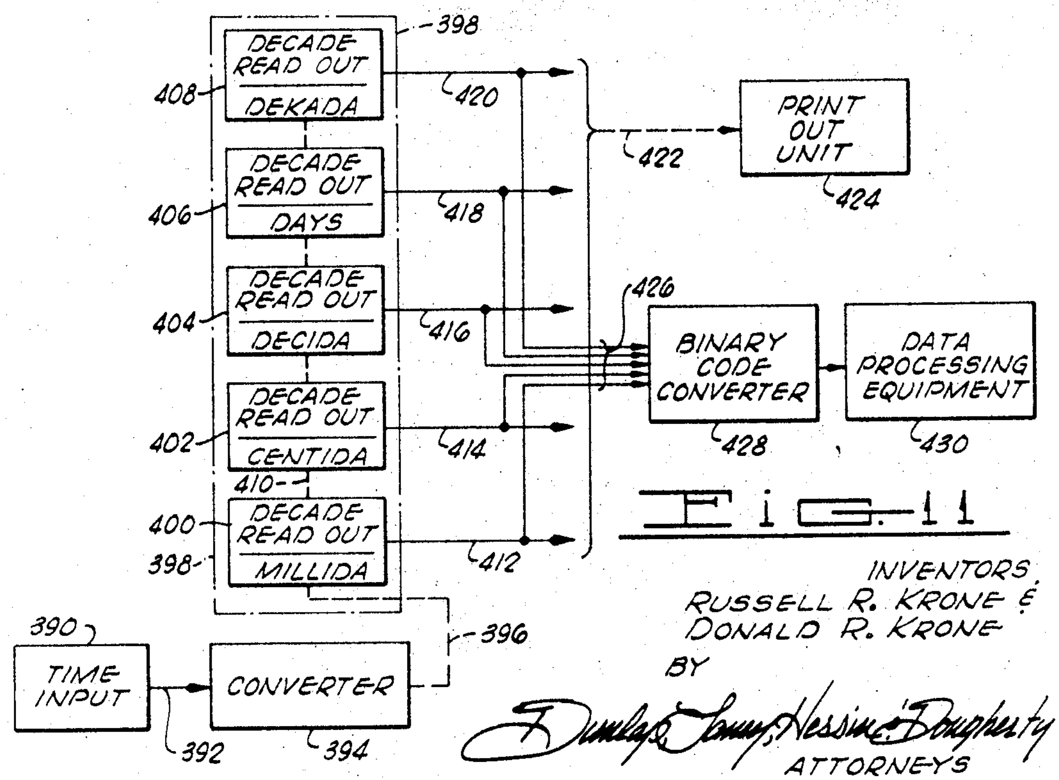
FIG. 11 is a block diagram of the invention as it may be employed for digital readout of metric time.

The block diagram of FIG. 11 discloses an alternative application of the decade readout circuitry which is able to maintain continuous digital indication of time in metric system units, a novel concept which may be aptly termed "metric time." The concept of metric time holds great promise for future applications due to its susceptibility to universal adoption, its capability of insertion and integration into various types of data systems, the ability to more acturately anticipate a given point in time for execution of predetermined action, and various other advantages which will no doubt become apparent as the system is adopted and utilized.

The metric time system may be constructed using the day as a basic unit in the metric system. Thus, the basic unit or day is broken into 10 parts and other submultiples and multiples are ordered in the similar decimal system, viz. the metric decimal system. By so doing, entire date and time information can be represented and tracked as a single digital number, and this provides great advantage for entering time into other data computation. For example, the date of Oct. 31, at 2:37 p.m. may read 305,677. Such a metric time system would then break down as follows:

| | | |
|---|---|---|
| 1000 | days=1 kiloda | |
| 100 | days =1 hectoda | |
| 10 | days=1 dekada | |
| 1 | day=1 da | |
| 1/10 | day=1 decida | =2 hr. and 24 min. |
| 1/100 | day=1 centida | =14.4 min. |
| 1/1000 | day=1 millida | =1.44 min. |
| 1/1,000,000 | day=1 microda | =0.0864 sec. |

In order to convert from standard to metric time, the equation $A/B = C$ applies where: $A$ is equal to the number of minutes since midnight (total hours times 60 plus the minutes past the last hour); $B$ is equal to the number of minutes in a day (1440); and, $C$ is equal to metric time.

The block diagram of FIG. 11 illustrates the manner in which a time input can be readout as metric time for digital input and data processing. Thus, a time input 390 e.g. a synchronous electric motor providing a time proportional output, provides a metered time output via connection 392 to a suitable converter 394. The converter 394 represents some form of gear train or other mechanical element which breaks down motional output from time input 390 as a time-proportioned rotational output along dash-line 396 to drive a decade selector 398 such as the selector 12 of FIG. 1. The decade selector 398 consists of a series of decade selectors 400, 402, 404, 406 and 408.

The decade readout 400 responds to rotational input via line 396 to provide a count output in millidas. Each ten-count registration or complete revolution of decade readout 400 causes rotational output via line 410 to rotate the decade readout 402 to register 1 centida count. Similarly and in decade sequence, the respective decade readouts 404, 406 and 408 are actuated to register decidas, das and dekadas, respectively.

Upon actuation for digital readout, the respective leads 412, 414, 416, 418 and 420 convey a switch closure representative of the appropriate digit for each decimal unit of time; that is, the count digit for each of the millida, centida, decida, das and dekada values. These outputs on leads 412 through 420 may be applied as shown by dash-line 422 to a conventional type of print-out unit 424. Alternatively, and as probably required for further data processing, the leads 412, 414, 416, 418 and 420 may be parallelled as by group 426 for input to a selected form of binary code converter 428, the output of which is then applied to data processing equipment 430.

It is contemplated that the concept of metric time holds great possibility for future application as technology and business endeavors move deeper into the realm of operations wherein fast, accurate computation and processing of all data is necessitated. The metric-time system makes time input to a data processing machine increasingly desirable as it is more susceptible to inclusion in whatever the machine language, and it requires no elaborate conversion as is necessitated with use of standard time.

The foregoing discloses novel register reading equipment which lends greater economy and reliability to remote interrogation equipment. The system has great flexibility and a wide variety of applications as it is directly interconnectable into existing data communications systems, this making practically unlimited the number of remote stations susceptible of interrogation. In addition, the present register interrogation system has the capability of distinguishing any of a great number of individual stations or meter settings which might be present at a single remote location, i.e. accessible through a single telephone connection interface.

Changes may be made in the combination and arrangement of elements as heretofore set forth in the specification and shown in drawings; it being understood that changes may be made in the embodiments disclosed without departing from the spirit and scope of the invention as defined in the following claims.

What is claimed is:

1. Apparatus for reading of remote rotary registers to derive a count indication for transmission via dataphone system to a central station for record indication, comprising:

digital selector means having a plurality of decade counting wheels disposed in interactive axial alignment for successive decade registry, one of said digital selector means counting wheels receiving input rotation from one of said remote rotary registers and remaining ones of said counting wheels being actuatable to advance intermittently in count rotation in decade relationship as between successive counting wheels;

common contact wafer means having a single circular common contact surface thereon and each being disposed around the periphery of one of said counter wheels in axial alignment at respective first sides of said counter wheels;

digit contact wafer means having a plurality of equally spaced digit contact surfaces thereon and each being disposed around the periphery of one of said counter wheels in axial alignment at respective second sides of said counter wheels;

contact means secured at a predetermined position about each of said counter wheels to extend radially from the peripheral surface thereof, said contact means for each counter wheel being in continual contact with a respective one of said common contact wafer surfaces and said digit contact wafer surface;

plural digit conductor means each connected in parallel to the respective digit contact surface of each digit contact wafer means and each being connected as input to said dataphone system; and plural common conductor means connected between each of said common contact surface and said data phone system.

2. Apparatus as set forth in claim 1 which is further characterized to include:

scanning means actuated from said central station via said dataphone system to provide energization of each of said common conductor means such that each contact means completes a circuit to a selected one of said digit conductor means which is indicative of the digital position of the respective counterwheel.

3. Apparatus as set forth in claim 1 which is further characterized to include:

selector switch means having a plurality of selector contacts and a common contact and including wiper means for successively connecting each of said plurality of contacts to the common contact, said common contact being connected to supply input to said dataphone system;

plural conductor means each connecting one of said plural common conductor means to a respective one of said selector contacts;

commutator means including a motor drive which is energized in response to transmission from said dataphone system to drive said selector switch means through a portion of a revolution whereupon each of said selector contacts is successively contacted by said wiper means.

4. Apparatus as set forth in claim 1 wherein said common contact wafer means comprises:

circular wafer means formed from insulative material and having a continuous, circular conductive surface secured on one side thereof for contact with said contact means.

5. Apparatus as set forth in claim 1 wherein said digit contact wafer means comprises:

circular wafer means formed from insulative material and having 10, equi-spaced digit contact surfaces secured about one side thereof for intermittent contact with said contact means.

6. Apparatus as set forth in claim 1 which is further characterized to include:

a plurality of diode network means each interconnected in one of said plural digit conductor means leading from said digit contact wafer means to provide a binary coded output therefrom.

7. Apparatus as set forth in claim 3 which is further characterized to include:

one or more register identification conductors connected between initially contacted separate ones of said selector contacts and selected ones of said plural conductor means to provide a digital meter identification to said dataphone system.

8. Apparatus as set forth in claim 1 which is further characterized to include:

input means providing rotation to said digital selector means which is synchronized with time such that each of said successive decade counting wheels contributes to a tally of time in metric system measure.

* * * * *